US012197591B1

(12) United States Patent
Oz et al.

(10) Patent No.: US 12,197,591 B1
(45) Date of Patent: Jan. 14, 2025

(54) SYSTEM AND METHOD FOR REAL-TIME DETECTION OF UNRESTRICTED FILE UPLOAD VULNERABILITIES IN NODE.JS APPLICATIONS

(71) Applicants: Harun Oz, Miami, FL (US); Ahmet Aris, Miami, FL (US); Abbas Acar, Miami, FL (US); Amin Kharraz, Miami, FL (US); Selcuk Uluagac, Miami, FL (US)

(72) Inventors: Harun Oz, Miami, FL (US); Ahmet Aris, Miami, FL (US); Abbas Acar, Miami, FL (US); Amin Kharraz, Miami, FL (US); Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/807,438

(22) Filed: Aug. 16, 2024

(51) Int. Cl.
   *G06F 21/57* (2013.01)
(52) U.S. Cl.
   CPC ...... *G06F 21/577* (2013.01); *G06F 2221/033* (2013.01)
(58) Field of Classification Search
   CPC ........................ G06F 21/577; G06F 2221/033
   See application file for complete search history.

(56) References Cited

U.S. PATENT DOCUMENTS

| | | | | |
|---|---|---|---|---|
| 7,529,682 | B2 * | 5/2009 | Geller | G06Q 50/10 705/317 |
| 8,433,768 | B1 * | 4/2013 | Bush | H04L 63/1433 703/23 |
| 10,855,717 | B1 * | 12/2020 | Feiman | G06F 21/57 |
| 11,201,896 | B1 * | 12/2021 | Watters | H04L 63/1466 |
| 2004/0158746 | A1 * | 8/2004 | Hu | H04L 63/0815 726/8 |
| 2005/0138426 | A1 * | 6/2005 | Styslinger | H04L 63/0281 709/224 |
| 2006/0031398 | A1 * | 2/2006 | Hirao | G06F 16/954 709/217 |
| 2012/0311713 | A1 * | 12/2012 | Amit | H04L 63/1466 726/25 |
| 2012/0311714 | A1 * | 12/2012 | Amit | H04L 63/1433 726/25 |
| 2015/0058950 | A1 * | 2/2015 | Miu | G06F 21/31 726/7 |
| 2015/0113626 | A1 * | 4/2015 | Bocanegra Alvarez | H04L 63/0815 726/8 |
| 2015/0278805 | A1 * | 10/2015 | Spencer, III | G06Q 20/3274 705/44 |

(Continued)

FOREIGN PATENT DOCUMENTS

CN 112182583 A * 1/2021 ........... G06F 21/577

*Primary Examiner* — Meng Li
(74) *Attorney, Agent, or Firm* — SALIWANCHIK, LLOYD & EISENSCHENK

(57) ABSTRACT

Systems and methods for detecting unrestricted file upload (UFU) vulnerabilities in Node.js (e.g., Node.js web applications) are provided. A lightweight framework can be used, drawing on a comprehensive evaluation of unique UFU-type attack types from multiple sources. By tailoring these attack instances to the Node.js ecosystem, systems and methods of embodiments of the subject invention offer more thorough coverage of potential attack vectors than existing technologies and tools.

15 Claims, 1 Drawing Sheet

(56) References Cited

U.S. PATENT DOCUMENTS

| | | | | |
|---|---|---|---|---|
| 2015/0379273 | A1* | 12/2015 | Chess | G06F 21/52 |
| | | | | 726/25 |
| 2016/0134650 | A1* | 5/2016 | Farmer | H04L 63/1433 |
| | | | | 726/23 |
| 2019/0205543 | A1* | 7/2019 | Wei | G06F 11/3684 |
| 2021/0044637 | A1* | 2/2021 | Lee | H04L 65/4025 |
| 2021/0303696 | A1* | 9/2021 | Weber | G06F 21/577 |
| 2022/0210200 | A1* | 6/2022 | Crabtree | G06F 16/951 |
| 2023/0014881 | A1* | 1/2023 | O'Hara | G07F 17/3234 |
| 2023/0318956 | A1* | 10/2023 | Kurakami | G06F 13/00 |
| | | | | 709/224 |
| 2024/0106701 | A1* | 3/2024 | Malkin | H04L 41/0886 |
| 2024/0169067 | A1* | 5/2024 | Kurakami | G06F 21/577 |
| 2024/0220635 | A1* | 7/2024 | Finke | G06F 21/577 |
| 2024/0346087 | A1* | 10/2024 | Quigley | G06F 16/951 |

* cited by examiner

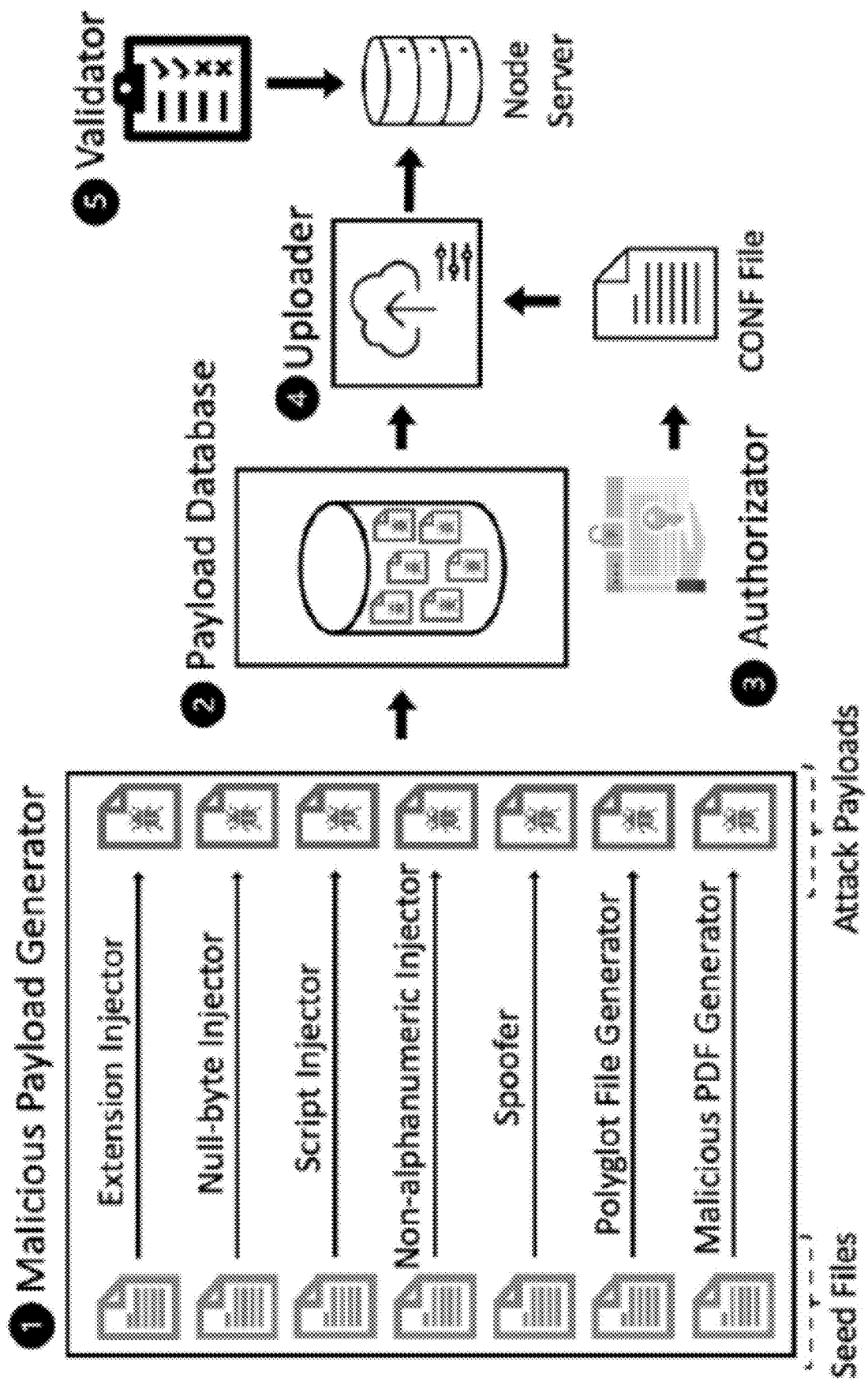

SYSTEM AND METHOD FOR REAL-TIME DETECTION OF UNRESTRICTED FILE UPLOAD VULNERABILITIES IN NODE.JS APPLICATIONS

GOVERNMENT SUPPORT

This invention was made with government support under 2219920 awarded by National Science Foundation. The government has certain rights in the invention.

BACKGROUND

Node.js is a cross-platform, open-source JavaScript runtime environment that can run on different operating systems (e.g., Linux, Unix, Windows, macOS). Node.js runs on the V8 JavaScript engine and executes JavaScript code outside a web browser. Node.js allows for use of JavaScript to write command line tools and for server-side scripting. The rise of Node.js has led to the implementation of server-side features like file uploads, but it has also brought unique security challenges.

BRIEF SUMMARY

Embodiments of the subject invention address the security challenges of Node.js by providing novel and advantageous systems and methods for detecting (e.g., in real-time) unrestricted file upload (UFU) vulnerabilities in Node.js (e.g., Node.js web applications). A lightweight framework can be used, drawing on a comprehensive evaluation of unique UFU-type attack types from multiple sources. By tailoring these attack instances to the Node.js ecosystem, systems and methods of embodiments of the subject invention offer more thorough coverage of potential attack vectors than existing technologies and tools.

In an embodiment, a system for detecting UFU vulnerabilities in Node.js can comprise: a processor; and a machine-readable medium in operable communication with the processor and having instructions stored thereon that, when executed by the processor, perform the following steps: i) generating attack payload files configured to trigger UFU attacks on at least one target web application; ii) storing the attack payload files in a payload database; iii) using a Node.js script to automate collection of authorization data; iv) uploading the attack payload files to a side of the at least one target web application; and v) validating a response by the at least one target web application to attacks from the attack payload files, using validation techniques tailored to an attack type for each attack from the attack payload files. The authorization data can comprise login credentials, cookie tokens, and/or request headers. The uploading of the attack payload files can comprise first authorizing the attack payload files via the authorization data. The using of the Node.js script to automate collection of authorization data can comprise generating a configuration file (e.g., a JavaScript object notation (JSON) file. The authorizing of the attack payload files can comprise using the configuration file. The generating of attack payload files can comprise receiving seed files and transforming the seed files into the attack payload files. The generating of attack payload files can comprise using at least one of the following: a) a malicious extension injector; b) a null-byte injector; c) a script injector; d) a non-alphanumeric injector; e) a spoofer; f) a polyglot file generator; and/or g) a malicious file generator (e.g., all of a)-g) or any combination thereof). The instructions when executed can further perform the following step: vi) before validating the response by the at least one target web application, causing the server side of the at least one target web application to run the attack payload files. The server side of the at least one target web application can be, for example, a node server. The system can further comprise a display in operable communication with the processor and/or the machine-readable medium. The instructions when executed can further perform the following step: vii) displaying (on the display) the response by the at least one target web application and/or the validation of the response by the at least one target web application.

In another embodiment, a method for detecting UFU vulnerabilities in Node.js can comprise: i) generating (e.g., by a processor) attack payload files configured to trigger UFU attacks on at least one target web application; ii) storing (e.g., by the processor) the attack payload files in a payload database; iii) using (e.g., by the processor) a Node.js script to automate collection of authorization data; iv) uploading (e.g., by the processor) the attack payload files to a server side of the at least one target web application; and v) validating (e.g., by the processor) a response by the at least one target web application to attacks from the attack payload files, using validation techniques tailored to an attack type for each attack from the attack payload files. The authorization data can comprise login credentials, cookie tokens, and/or request headers. The uploading of the attack payload files can comprise first authorizing (e.g., by the processor) the attack payload files via the authorization data. The using of the Node.js script to automate collection of authorization data can comprise generating (e.g., by the processor) a configuration file (e.g., a JavaScript object notation (JSON) file. The authorizing of the attack payload files can comprise using (e.g., by the processor) the configuration file. The generating of attack payload files can comprise receiving seed files and transforming (e.g., by the processor) the seed files into the attack payload files. The generating of attack payload files can comprise using (e.g., by the processor) at least one of the following: a) a malicious extension injector; b) a null-byte injector; c) a script injector; d) a non-alphanumeric injector; e) a spoofer; f) a polyglot file generator; and/or g) a malicious file generator (e.g., all of a)-g) or any combination thereof). The method can further comprise: vi) before validating the response by the at least one target web application, causing (e.g., by the processor) the server side of the at least one target web application to run the attack payload files. The server side of the at least one target web application can be, for example, a node server. The method can further comprise: vii) displaying (e.g., on a display in operable communication with the processor) the response by the at least one target web application and/or the validation of the response by the at least one target web application.

BRIEF DESCRIPTION OF DRAWINGS

FIG. 1 shows an architecture of a system for detecting unrestricted file upload (UFU) vulnerabilities in Node.js, according to an embodiment of the subject invention.

DETAILED DESCRIPTION

Embodiments of the subject invention provide novel and advantageous systems and methods for detecting (e.g., in real-time) unrestricted file upload (UFU) vulnerabilities in Node.js (e.g., Node.js web applications). A lightweight framework can be used, drawing on a comprehensive evaluation of unique UFU-type attack types sourced from UFU-related common vulnerabilities and exposures (CVEs) (e.g., from 2002 to February 2023), official Open Worldwide Application Security Project (OWASP) resources, cybersecurity studies, implementation mistakes made by developers, and/or specific Node.js technical features. By tailoring these attack instances to the Node.js ecosystem, systems and methods of embodiments the subject invention offer more thorough coverage of potential attack vectors than existing technologies and tools.

No existing tools specifically address the Node.js landscape due to its technical differences. Embodiments of the subject invention fill this gap, drawing on the comprehensive evaluation of unique UFU-type attack types from different sources, while providing significant advantages over related art systems and methods when it comes to detecting UFU vulnerabilities. Embodiments provide the first dedicated framework specifically designed and optimized for detecting UFU vulnerabilities in the unique context of Node.js applications, which has experienced rapid growth and widespread adoption since its introduction in 2009. Node.js is especially preferred by major companies (e.g., Microsoft, Netflix) to develop scalable high-traffic web applications. Key advantages of embodiments of the subject invention include a targeted approach, advanced malicious payload generation, dynamic analysis, and adaptive and extendable payload database.

With respect to the targeted approach, embodiments address the distinctive characteristics and ecosystem of Node.js applications. The Node.js environment, with its event-driven, non-blocking input/output (I/O) model and vast node package manager (NPM) ecosystem, presents unique security challenges. Embodiments of the subject invention address these challenges by considering implementation mistakes and execution environments that could lead to UFU risks. This targeted approach allows for more accurate detection of UFU vulnerabilities in Node.js applications compared to tools designed for other ecosystems.

With respect to advanced malicious payload generation, embodiments include sub-components (e.g., malicious extension injector, null-byte injector, and script injector) to create an extensive variety of sophisticated attack payloads compared to related art systems and methods. This wide-ranging generation ability ensures that modern web applications are tested against a myriad of potential attacks that can trigger the UFU vulnerability in the web application.

With respect to dynamic analysis, unlike static analysis-based systems and methods, which only inspect the source code of the applications, embodiments of the subject invention employ dynamic analysis. This real-time evaluation captures vulnerabilities that might be missed in static checks, providing a more holistic view of potential threats.

With respect to adaptive and extendable payload database, beyond storing internally generated payloads, embodiments of the subject invention can be expanded with external attack payloads. This allows developers (and/or users) to continuously update and adapt to emerging threats. This flexibility ensures that systems and methods of embodiments of the subject invention can remain at the forefront of UFU vulnerability detection, even as attack methods evolve.

Embodiments of the subject invention provide fully configurable real-time UFU vulnerability detector frameworks, systems, and methods specially designed for Node.js applications. In order to achieve this objective, the framework/system/method can automatically generate attack payload files for a range of attacks, upload the malicious payloads to the target web application in an automated fashion, and detect the UFU vulnerabilities of the application in real-time.

FIG. 1 shows an architecture of a system for detecting unrestricted file upload (UFU) vulnerabilities in Node.js, according to an embodiment of the subject invention. Referring to FIG. 1, the system can include a malicious payload generator, a payload database, an authorization module, an uploader, and/or a validator. This modular design can facilitate comprehensive testing of web applications and libraries for UFU vulnerabilities.

The malicious payload generator (or malicious payload generator module) can create payload files to trigger UFU attacks on web applications. It can comprise multiple attack generator components that transform seed files into attack payloads. The malicious payload generator can include the following components: a malicious extension injector; a null-byte injector; a script injector; a non-alphanumeric injector; a spoofer; a polyglot file generator; and/or a malicious file generator. These components are described in more detail below.

Malicious extension injector: This component can take a seed file as input (e.g., test.js) and inject multiple extensions through either random prepending or appending with benign extensions (e.g., test.js.png, test.png.js), removing the file extension entirely (e.g., test), disguising the file extension by randomly altering the case of its characters (e.g., test.Js, testJS), and/or appending unusual extensions (e.g., seed.html5, test.js6). It can also generate filenames with triple-appended extensions (e.g., seed.pdf.html.png), randomly mixed case extensions (e.g., test.Js, test.html.jpeg), and/or unusual extensions (e.g., jsx, mjs, xhtml).

Null-byte injector: This module can insert null-byte characters at random positions within the file name. In order to enhance the attack coverage, this component can be based on the set of files generated by the malicious extension injector. Specifically, this component can place different null-bytes in random positions in the file name. For example, this module can create file names, such as test.js%00.png, test.js%.png.

Script injector: This component can receive a seed input file and inject script payloads at random positions within the file name. Similar to the null-byte injector component, this module can increase the attack coverage of the system by injecting payload scripts into random positions of the file name. For instance, using this module, a JavaScript seed payload file named "test.png.js" can be transformed into "test.png [payload].js".

Non-alphanumeric injector: This component can take a seed input file and inject malicious non-alphanumeric characters into random positions in the file name. For example, given a valid PNG file named "file.png" as input, the component can generate file names such as "/../..png:"

Spoofer: This component can take an input file and generate a spoofed version with either altered multipurpose internet mail extensions (MIME) type or magic bytes. It can include two separate functionalities: MIME-type spoofing; and magic-byte spoofing. For MIME type spoofing, the component can read a JavaScript object notation (JSON) file containing a list of MIME types and their corresponding file extensions. It can iterate through the input files and alter their MIME type from the original value (e.g., "text/javascript") to a different MIME type (e.g., "application/pdf") while keeping the file content unchanged. The output files can be saved with the same file extension but with an updated MIME type, potentially bypassing file type validation checks based on MIME types. In the case of magic-byte spoofing, the component can read a JSON file containing a list of magic bytes associated with different file formats. It can iterate through the input files and modify the magic byte of each file with another file format. The output files can be saved with a new file extension corresponding to the spoofed magic byte, while the file content can remain the same.

Polyglot file generator: This component can create a set of polyglot files to evaluate the web application's ability to handle files with mixed content types.

Malicious file generator: This component can generate various types of malicious files by embedding payloads within benign portable document format (PDF), scalable vector graphics (SVG), and hypertext markup language (HTML) files. The generator can create JavaScript-embedded and compressed PDF files, SVG files with different payloads, and modified HTML and education markup language (EML) files.

The payload database (or payload database module) can store attack payloads that can be uploaded to the target web application using the uploader. In addition to the payloads generated by the malicious payload generator, an external attack payload import mechanism can be implemented (e.g., in a fully configurable manner). This feature can enable web application and library developers to conveniently utilize the file upload analysis tool with pre-existing attack payloads, as well as to implement their own attacks.

The authorization component (or authorization module) can be a Node.js script that automates the collection of essential data, such as login credentials, cookie tokens, and/or request headers. The script can prompt the user for required details such as login uniform resource locator (URL), upload target URL, upload directory, username, and/or password. Then, it can navigate and extract the session cookie and headers, create a configuration object, and/or save it as a JSON file. The configuration file can be employed by the uploader to automate the upload of payload files.

The uploader (or uploader module) can automate the process of uploading attack payload files to the server side of the target web application. This module can necessitate two critical input files: 1) a configuration file retrieved from the authorization module; and 2) a payload file designated for uploading to the target web application. The uploader can include necessary functions that automate the upload process for different payload files, such as preparing form data.

The validator (or validator module) can carry out critical steps to validate each attack, employing tailored techniques for different attack categories. For attacks involving malicious characters or extensions in the file name, the validator can assess whether the web application effectively sanitized the file name and if the server-stored file name contains any malicious characters. In order to evaluate file type-based and file content-based attacks, the validator can remotely execute the file by accessing its path via the URL, which can be retrieved from the target web application server.

Embodiments of the subject invention have several important applications, including but not limited to web application security, security auditing, DevSecOps (development, security, and operations) and library integration, and library security analysis. With respect to web application security, a primary application of embodiments lies in bolstering the security of Node.js web applications by accurately identifying and mitigating UFU vulnerabilities. With respect to security auditing, the detection systems and methods can be used by security auditors to evaluate the security posture of Node.js web applications. With respect to DevSecOps and library integration, embodiments can be assimilated into existing DevSecOps pipelines, facilitating continuous security testing and analysis throughout the software development lifecycle, and/or can be employed to detect security issues in third-party libraries. With respect to library security analysis, embodiments, can also be utilized to detect and address security issues in third-party libraries, ensuring the robustness of Node.js applications against potential vulnerabilities.

Related art systems and methods have limited understanding of the unique characteristics and complexities of Node.js applications, such as library usage patterns and diverse execution environments. Conversely, embodiments of the subject invention are specifically designed to tackle these challenges in detecting UFU vulnerabilities in Node.js applications, especially in their dynamic nature. By employing a focused approach that considers the distinct features of Node.js applications, embodiments of the subject invention facilitate more accurate and effective detection of UFU vulnerabilities compared to related art tools by considering the dynamic nature of Node.js Additionally, embodiments of the subject invention are not only capable of detecting (and configured to detect) UFU vulnerabilities in Node.js applications, but also capable of detecting (and configured to detect) implementation mistakes in the file upload libraries in Node.js.

Embodiments of the subject invention provide a focused technical solution to the focused technical problem of detecting UFU vulnerabilities in Node.js. The solution is provided by utilizing a malicious payload generator, a payload database, an authorization module, an uploader, and a validator in a novel framework. Embodiments of the subject invention can the computer system detecting UFU vulnerabilities in Node.js by efficiently performing the detection compared to related art systems (this can free up memory and/or processor usage).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A system as shown in FIG. 1 was used to evaluate the security posture of six file upload libraries and 11 real-world web applications. Serious implementation mistakes were identified in the file upload libraries, and 58 vulnerabilities were identified in real-world web applications. Nineteen CVEs and two United States Computer Emergency Readiness Team (US-CERT) cases were received for the security issues reported. This example demonstrates the effectiveness of the system shown in FIG. 1 at detecting UFU vulnerabilities in Node.js.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting unrestricted file upload (UFU) vulnerabilities in Node.js, the system comprising:
    a processor; and
    a machine-readable medium in operable communication with the processor and having instructions stored thereon that, when executed by the processor, perform the following steps:
    i) generating attack payload files configured to trigger UFU attacks on at least one target web application;
    ii) storing the attack payload files in a payload database;
    iii) using a Node.js script to automate collection of authorization data;
    iv) uploading the attack payload files to a server side of the at least one target web application; and
    v) validating a response by the at least one target web application to attacks from the attack payload files, using validation techniques tailored to an attack type for each attack from the attack payload files,
    the generating of attack payload files comprising using all of the following:
        a) a malicious extension injector;
        b) a null-byte injector;
        c) a script injector;
        d) a non-alphanumeric injector;
        e) a spoofer;
        f) a polyglot file generator; and
        g) a malicious file generator.

2. The system according to claim 1, the authorization data comprising login credentials, cookie tokens, and request headers.

3. The system according to claim 1, the uploading of the attack payload files comprising first authorizing the attack payload files via the authorization data.

4. The system according to claim 3, the using of the Node.js script to automate collection of authorization data comprising generating a configuration file, and
    the authorizing of the attack payload files comprising using the configuration file.

5. The system according to claim 4, the configuration file being a JavaScript object notation (JSON) file.

6. The system according to claim 1, the generating of attack payload files comprising receiving seed files and transforming the seed files into the attack payload files.

7. The system according to claim 1, the instructions when executed further performing the following step:
    vi) before validating the response by the at least one target web application, causing the server side of the at least one target web application to run the attack payload files.

8. The system according to claim 1, further comprising a display in operable communication with the processor,
    the instructions when executed further performing the following step:
    vii) displaying, on the display, a validation of the response by the at least one target web application.

9. A method for detecting unrestricted file upload (UFU) vulnerabilities in Node.js, the method comprising:
    i) generating attack payload files configured to trigger UFU attacks on at least one target web application;
    ii) storing the attack payload files in a payload database;
    iii) using a Node.js script to automate collection of authorization data;
    iv) uploading the attack payload files to a server side of the at least one target web application; and
    v) validating a response by the at least one target web application to attacks from the attack payload files, using validation techniques tailored to an attack type for each attack from the attack payload files,
    the generating of attack payload files comprising using all of the following:
        a) a malicious extension injector;
        b) a null-byte injector;
        c) a script injector;
        d) a non-alphanumeric injector;
        e) a spoofer;
        f) a polyglot file generator; and
        g) a malicious file generator.

10. The method according to claim 9, the authorization data comprising login credentials, cookie tokens, and request headers.

11. The method according to claim 9, the uploading of the attack payload files comprising first authorizing the attack payload files via the authorization data.

12. The method according to claim 11, the using of the Node.js script to automate collection of authorization data comprising generating a configuration file, and the authorizing of the attack payload files comprising using the configuration file.

13. The method according to claim 12, the configuration file being a JavaScript object notation (JSON) file.

14. The method according to claim 9, the generating of attack payload files comprising receiving seed files and transforming the seed files into the attack payload files.

15. The method according to claim 9, further comprising:
   vi) before validating the response by the at least one target web application, causing the server side of the at least one target web application to run the attack payload files.

* * * * *